United States Patent [19] [11] 3,880,773
White et al. [45] Apr. 29, 1975

[54] LEAD-SILICATE COMPOSITE STABILIZERS

[75] Inventors: Edward L. White, Freehold; Bernard Engelbart, Trenton, both of N.J.

[73] Assignee: N.L. Industries, Inc.

[22] Filed: May 14, 1973

[21] Appl. No.: 360,091

[52] U.S. Cl. ............. 252/400 A; 106/297; 106/306; 252/400 R; 260/45.75 R
[51] Int. Cl. ...... B01j 1/16; C08f 45/58; C08g 51/58
[58] Field of Search .................. 252/400 A, 400 R; 260/45.75 R; 106/297, 306

[56] References Cited
UNITED STATES PATENTS

| | | | |
|---|---|---|---|
| 3,382,199 | 5/1968 | Scullin | 252/400 R |
| 3,461,081 | 8/1969 | Sugahara et al. | 252/400 R |
| 3,562,180 | 2/1971 | White et al. | 252/400 R |
| 3,668,144 | 6/1972 | Pearson | 252/400 R |

*Primary Examiner*—Benjamin R. Padgett
*Assistant Examiner*—Irwin Gluck

[57] ABSTRACT

Novel stabilizers for vinyl resins are described comprising a composite of a basic lead compound and a hydrous magnesium silicate such as a platey talc. Among the basic lead compounds are dibasic leas phosphite, basic lead salts of organic carboxylic acids and mixtures of dibasic lead phosphite and tribasic lead sulfate.

10 Claims, No Drawings

LEAD-SILICATE COMPOSITE STABILIZERS

BACKGROUND OF THE INVENTION

This invention is concerned with novel heat stabilizers for halogen-containing vinyl resins, particularly polyvinyl chloride resins.

In the past, composite pigments of lead compounds and silica have been described comprising a silica core surrounded by a coating of the lead compound; e.g., lead monoxide, basic lead sulfates, basic lead chlorides and chromated lead oxides. These composite pigments and their method of preparation are more fully described in U.S. Pat. Nos. 2,477,277; 3,050,048; 3,072,495 and 3,118,780. In most cases, as a final step in preparing these pigments, solid mixtures of the lead compound and silica are calcined at temperatures between about 450°C and 750°C, depending on the particular pigment. The lead compounds used in these composite pigments are heat stable and are therefore resistant to high temperature calcination. However, many other lead compounds such as dibasic lead phosphite and basic lead salts of organic acids such as basic lead stearate, maleate, fumarate and phthalate, to name a few, have not been successfully coated on most siliceous substrates, chiefly due to the fact that these compounds pyrolyze or decompose at such high calcination temperatures More recently, dibasic lead phosphite has been precipitated on a diatomaceous silica. This product and the process for its preparation is described in British Pat. No. 1,215,659 to Guiliani. However, it has been found that the precipitated dibasic lead phosphite in that composite is only weakly combined with the silica and is easily separable.

The instant invention provides a novel stabilizer comprising a stable composite of a heat sensitive lead compound such as dibasic lead phosphite, basic lead salts of organic acids and mixtures of basic lead phosphite and sulfate with hydrous magnesium silicate substrate. The instant composites are formed by a method which requires no high temperature calcincation which might tend to destroy the lead compound.

SUMMARY OF THE INVENTION

The stabilizers of this invention comprise a composite of a basic lead compound with a hydrous magnesium silicate substrate such as talc. Although the structure of the composite is not completely understood, it is believed that the basic lead compound is substantially complexed or associated with the surface of the magnesium silicate substrate. In either case a tenacious coating of the basic lead compound is formed on the silicate substrate. The basic lead compound coating provides heat and light stability for vinyl resins into which the composite is incorporated while the silicate substrate reduces the density of the composite making it readily dispersable; for example in liquid compositions such as plastisols and organosols which are used in commercial forming operations.

The basic lead compounds of the composite can be represented by the formula: n PbO . PbA wherein n is a number from 1 to 4 and A is anion radical selected from the group consisting of phosphite, organic carboxylate, mixtures of phosphite and sulfate, mixtures of organic carboxylate and phosphite and mixtures of organic carboxylate and sulfate.

The hydrous magnesium silicate substrates of this invention are characterized by having from 59 to 64 percent combined $SiO_2$ and from about 28 to 32 percent combined MgO by weight. By the term hydrous is meant the presence in the silicate of silanol or silane diol groups. The preferred hydrous magnesium silicate substrate is a hydrous platey talc containing approximately 62 percent $SiO_2$ and 31 percent MgO. Another characteristic of the silicate substrates is their low abrasive properties. The substrates offer a degree of "softness" to the stablilizer which allows blending of the stabilizers with vinyl resins without eroding or wearingaway metal equipment used for the blending operation.

The stabilizer should comprise from about 30 and 80 percent of basic lead compound and from 20 to 70 percent of silicate substrate by weight and preferably from 50 to 75 percent of basic lead compound to from 25 to 50 percent silicate substrate by weight. If less than about 20 percent by weight of silicate substrate is present the stabilizer will tend to lose its low density properties such as dispersability in plastisols and organosols. If greater than about 70 percent by weight of substrate is employed, heat stability of the stabilizer is sacrificed.

In preparing the stabilizers of this invention, the silicate substrate is first mixed with water to form a slurry. To this slurry is added litharge together with additional water to form a substrate-litharge slurry. Next is added a catalyst such as acetic acid to the substratelitharge slurry to partially solubilize and activate the litharge. Finally, a reactive acid(S) is added to the catalyzed slurry which forms the basic lead compound and substrate composite in the slurry.

The reactive acid serves as the source of anion radical in the basic lead compound described in the above formula (A) and also drives the reaction to completion.

By using reactive acids such as phosphorous acid, stearic acid, phthalic acid and mixtures of phosphorous acid and sulfuric acid for example composites can be formed comprising dibasic lead phosphite, dibasic lead stearate, dibasic lead phthalate and mixtures of dibasic lead phosphite and tribasic lead sulfate respectively on the hydrous magnesium silicate substrate. Similarly, mixtures of phosphorous acid and organic carboxylic acids, and sulfuric acid and organic carboxylic acids can be employed as reactive acids to prepare the corresponding mixtures of basic lead compounds. Other basic lead salts or organic acids such as tetrabasic lead fumarate and dibasic lead maleate can be formed by using fumaric or maleic acid as the reactive acid.

After addition of the reactive acid, the formed stabilizer can then be recovered for example by filtering the slurry and drying the filter cake in an oven.

DESCRIPTION OF THE PREFERRED EMBODIMENTS

The basic lead compounds of this invention which are composited with the hydrous magnesium silicate substrate are those which are normally heat sensitive and decompose at high temperatures. They include basic lead inorganic salts such as dibasic lead phosphite and basic lead salts of organic carboxylic acids including basic lead salts of long chain aliphatic carboxylic acids having from about 8 to 20 carbon atoms; e.g. dibasic lead stearate and basic lead 2-ethyl hexanoates, basic lead lead salts of aromatic mono, di- & tricarboxylic acids such as dibasic lead phthalates, basic lead benzoates and basic lead trimellitates; and basic salts of α, B-unsaturated dicarboxylic acids e.g., dibasic lead maleate and tetrabasic lead fumarate.

For excellent over all dispersability in vinyl plastisols stabilizers of this invention comprising a composite of tribasic lead sulfate and dibasic lead phosphite wherein the weight ratio of tribasic lead sulfate to dibasic lead phosphite is from 1:1 to 3:1 and the amount of substrate is from 40 to 60 percent of the composite are preferred. A particularly preferred stabilizer for foamed plastisols is a tribasic lead sulfatedibasic lead phosphite-talc composite wherein the ratio of tribasic lead sulfate to dibasic lead phosphite is 3:1 and wherein the amount of talc is 50 percent of the weight of the stabilizer. In addition to excellent dispersability in plasticizers it imparts stable viscosity to the plastisol. With chemically blown vinyl foams it offers foam cell control and excellent overblow protection. It also gives foams of uniform small cell structure at processing temperatures as high as 425°C.

The preferred hydrous magnesium silicate substrate is a platey talc containing approximately 62 percent $SiO_2$ + 31 percent MgO plus small amounts of aluminum, iron titanium, calcium, sodium and potassium and having an MOH hardness of approximately 1.0.

For purposes of convenience this preferred silicate substrate will be hereinafter referred to as talc.

In the process for preparing the stabilizers of this invention, the talc is first mixed with water under agitation until a homogeneous slurry is obtained. The talc must be uniformly dispersed in the water to insure that individual particles of the talc will complex with the basic lead compounds to be formed in the subsequent steps of the process. If the slurry is not uniform, the final product will be a mixture of talc complexed particles and uncomplexed talc particles which cannot be easilty separated. The amount of water used in making the talc slurry is not cirtical but should be sufficient to accommodate a uniform talc dispersion. Generally, from 0.5 to 15 ml of water for each gram of talc is sufficient.

After the talc-water slurry becomes homogeneous, powdered litharge is transferred to the slurry with the aid of additional water to form a talc-litharge slurry. Other methods of forming the talc-litharge slurry can be utilized as for example by separately forming a talc slurry and a litharge slurry and combining the two or by forming a litharge slurry and dispersing the talc in the slurry. However, it is preferred to first form a uniform talc slurry followed by the addition of powdered litharge. The weight of powdered litharge to be added to the talc slurry is preferably from ⅓ to three times the weight of talc in order to achieve a final product containing from 25 to 75 percent of basic lead compound.

Although the litharge can be added to the talc slurry in many ways such as by predispersing it in water and slowly adding this predispersion to the talc slurry followed by addition of water, it is preferred to wet-bolt the powdered litharge using water through a screen having a mesh size of from between 80 to 100. This insures removal of large size agglomerates of litharge which may be difficult to disperse or break up in the slurry. To the so formed litharge-talc slurry is added a catalyst such as acetic acid to aid in the conversion of litharge to the basic lead compounds after the addition of reactive acid. Other acids which form soluble lead salts such as propionic acid, sulfonic acid and lactic acid can also be used as the catalyst.

Acetic acid is preferred since it is inexpensive and readily available.

The amount of acetic acid generally required for the catalysis of the litharge is from 0.003 to 0.004 g for each gram of litharge based on 100 percent acetic acid. Using 10 percent aqueous acetic acid 0.035 to 0.045 ml are required.

The amount of reactive acid to be used depends on the type of basic lead compound to be produced. Low amounts of acid relative to the amount of litharge used gives compounds of higher basicities and higher amounts of acid give lower basicities. However, all basic lead compounds complexed with talc according to this invention can be produced by using from 1/5 to ½ equivalent of reactive acid per mole of litharge. When using mixtures of acids the total number of equivalents of acid in the mixture must be from 1/5 to ½ the number of moles of litharge. The acid can be added in its pure form or diluted with water.

The reactive acid should be added slowly to the talc-litharge slurry with stirring to insure temperature control and prevent agglomeration of the slurry particles. It may be added at room temperature or at elevated temperatures if desired. Generally, the reactive acid is added over a period of from 1 to 4 hours. After addition of the acid the slurry may be heated to between 50° to 75°C to insure complete reaction. The stabilizer is then recovered by filtration of the reacted slurry after which it is dried to remove water. When using water-insoluble organic acids as the reactive acids e.g., stearic acid, to prepare the corresponding basic lead organic carboxylate-talc composites it is necessary to add a base such as monoethanolamine to the talc-litharge slurry to solubilize the acid. The acid is then added as an emulsion in water using a suitable emulsifying agent to disperse the acid.

It has been found that many other silica based substrates such as hydrous silica, hydrous calcium silicate, non-hydrous crystalline calcium silicate and and diatomaceous silica do not form composites with the basic lead compounds of this invention.

In order to more fully describe the instant invention, the following examples are given. All products prepared according to the examples showed excellent utility as stabilizers for polyvinyl chloride resins.

EXAMPLE 1

This example illustrates the preparation of a stabilizer comprising talc complexed with a mixture of tribasic lead sulfate and dibasic lead phosphite wherein the weight ratio of tribasic lead sulfate to dibasic lead phosphite is 3:1 and the amount of talc comprises 50 percent of the weight of the stabilizer.

Exactly 1000 g of a talc containing 31 percent of MgO and 62 percent of $SiO_2$ and having an MOH hardness of 1.0 was added to 7200 ml water with stirring to form a slurry. This slurry was stirred for 30 minutes in an 11 × 10 inches stainless steel vessel equipped with a 2 blade 5 inches diameter propeller. To this slurry was added 926.7 g of litharge together with 300 ml of water. Next 18 ml of 10 percent acetic acid was added. The soformed catalyzed slurry was then heated to 50°C and a mixture of 27.96 g of phosphorous acid (100 percent) and 75.65 g of sulfuric acid (100 percent) in 50 ml of $H_2O$ was added to the stirred slurry dropwise over a period of one hour while maintaining a reaction temperature of 50°–55°C. The slurry was stirred for an additional hour at 50°–55°C after which the slurry was filtered and the solid filter cake was dried 20 hours at 80°C. The yield of product was 2025.

The stabilizer was next tested in a chemically blown vinyl-foamed plastisol wherein 6 g of the stabilizer was dispersed in 5 g of an epoxy plasticizer, 95 g of dioctyl phthalate plasticizer and 100 g of a polyvinyl chloride resin. About 2 g of a blowing agent was also added. The stabilizer was easily dispersed in the plasticizer using a Hobart Homomixer at low to medium speed. In order to determine the viscosity stability of the plastisol, Brookfield viscosity readings were taken after one day and one week. At the end of 1 day the Brookfield viscosity of the plastisol was 2100 cps at 2 RPM at 25°C and 1980 cps at 20 RPM at 25°C. At the end of one week the viscosity was 2500 cps at 2 RPM and 2470 cps at 20 RPM at 25°C indicating excellent viscosity stability. The plastisols were also checked again for dispersability properties by observing evidence of settling or agglomeration on the stabilizer. No settling or agglomeration was found.

EXAMPLE 2

This example illustrates the preparation of a stabilizer comprising talc complexed with a mixture of tribasic lead sulfate and dibasic lead phosphite wherein the weight ratio of tribasic lead sulfate to dibasic lead phosphite is 1:1 and the talc comprises 40 percent of the weight of the stabilizer.

Exactly 166.67 g of a talc containing 31 percent of MgO and 62 percent of $SiO_2$ and having an MOH hardness of 1.0 was added to 1200 ml of water contained in a 7 × 6 inches stainless steel beaker equipped with a 2 blade 5 inches diameter propeller type stirrer. This slurry was stirred for 15 minutes at 25°–40°C. Then 231.36 g of litharge were wet-bolted (−100 mesh) with 500 ml of water and added to the talc slurry followed by 4.6 ml of 10 percent acetic acid. The talc-litharge slurry was stirred for 25 minutes and heated to 50°C. Then 13.98 g of phosphorous acid (100 percent) and 12.60 g of sulfuric acid (100 percent) were diluted with 50 ml of water, cooled to about 35°C and the mixture was added from a 60 ml dropping funnel to the talc-litharge slurry in one hour at a reaction temperature of 50°–55°C. The slurry was stirred for an additional hour at 50°–55°C and the resultant white product had a pH of 8.02. The product was recovered by filtering, drying the solid filter cake at 77°C for 22 hours and hammer-milling through an 0.030 inch screen.

The yield of the product was 420.0 g.

EXAMPLE 3

This example illustrates the preparation of a stabilizer comprising talc complexed with a mixture of tribasic lead sulfate and dibasic lead phosphite wherein the weight ratio of tribasic lead sulfate to dibasic lead phosphite is 1:1 and the talc comprises 50 percent of the weight of the stabilizer.

The procedure of Example 2 was repeated except the amounts of talc, litharge, acetic acid, phosphorous acid and sulfuric acid were replaced by the following amounts:

| | |
|---|---|
| a) Talc | 315.56 g |
| b) Litharge | 292.3 g |
| c) 10% Acetic Acid | 5.8 ml |
| d) Phosphorous Acid (100%) | 17.91 g |
| e) Sulfuric Acid (100%) | 16.15 g |

The final pH of the product was 8.44 and the yield was 635.9 g.

EXAMPLE 4

This example illustrates the preparation of a stabilizer comprising talc complexed with a mixture of tribasic lead sulfate and dibasic lead phosphite wherein the weight ratio of tribasic lead sulfate to dibasic lead phosphite is 1:1 and the talc comprises 60 percent of the weight of the stabilizer.

Exactly 375 g of talc, 231.36 g of litharge 2100 ml of water and 4.6 ml 10 percent acetic acid were slurried at 50°C exactly as in Example 2. A mixed phosphorous-sulfuric acids solution was prepared and added to the talc-litharge slurry as in Example 2. The pH of the white slurry was 8.17 and the yield of the product was 627.8 g.

EXAMPLE 5

This example illustrates the preparation of a stabilizer comprising talc complexed with a mixture of tribasic lead sulfate and dibasic lead phosphite wherein the weight ratio of tribasic lead sulfate to dibasic lead phosphite is 3:1 and the talc comprises 40 percent of the weight of the stabilizer.

Exactly 66.67 g of talc as described in Example 1 were stirred for 15 minutes at 20°–40°C with 550 ml of water contained in a stainless steel beaker equipped with a 3 blade 4 inches diameter propeller type stirrer. Then 92.67 g of litharge were wet-bolted (−100 mesh) with 100 ml of water and added to the stirred talc slurry followed by 1.8 ml of 10 percent acetic acid. The talc-litharge slurry was stirred for 15 minutes while heating to 50°C. Then 2.80 g of phosphorous acid (100 percent) and 7.56 g of sulfuric acid (100 percent) were diluted with 5.0 ml of water, cooled to about 30°C and the mixture was added from a 50 ml delivery burette to the talc-litharge slurry in one hour while maintaining a reaction temperature of 50°–55°C. The slurry was stirred for an additional hour at 50°–55°C. The product was recovered as in Example 2. The yield of the product was 169.0 g.

EXAMPLE 6

This example illustrates the preparation of a stabilizer comprising talc complexed with a mixture of tribasic lead sulfate and dibasic lead phosphite wherein the weight ratio of tribasic lead sulfate to dibasic lead phosphite is 3:1 and the talc comprises 60 percent of the weight of the stabilizer.

Exactly 150 g of the talc of Example 1, 92.67 g of litharge, 850 ml of water and 1.8 ml of 10 percent acetic acid were slurried at 50°C and treated with a mixed phosphoroussulfuric acids solution as in Example 5. The product was recovered as in Example 2.

EXAMPLE 7

This example illustrates the preparation of a stabilizer comprising talc complexed with dibasic lead phosphite wherein the weight ratio of the dibasic lead phosphite to talc is 2.33:1 (30 percent talc).

Exactly 120.00 g of talc containing 31 percent of MgO and 62 percent of $SiO_2$ and having an MOH hardness of 1.0 was added to 900 ml of water contained in a stainless steel beaker equipped with a 2 blade 5 inches diameter stirrer, hot plate and thermometer.

Then 253.87 g of litharge were wet-bolted (—100 mesh) with 1000 ml of water and added to the talc slurry followed by 2.5 ml of 10 percent acetic acid. The reaction beaker was heated to 38°–40°C with stirring. Then 30.92 g of phosphorous acid (100 percent) were diluted with 30 ml of water (40°C) and this phosphorous solution was added to the stirred 40°C talc-litharge slurry from a 60 ml dropping funnel in 1 hour. After 1 hour of additional stirring at 40°C, the resultant white slurry had a pH of 8.29. The product was recovered by filtration, dired at 100°C for 16½ hours and hammer-milled through an 0.030 inch screen.

The yield of the product was 398.1 g.

EXAMPLE 8

This example illustrates the preparation of a stabilizer comprising talc complexed with dibasic lead phosphite wherein the weight ratio of dibasic lead phosphite to talc is 4:1 (20 percent talc).

The procedure of Example 7 was repeated except the amounts of talc, litharge, acetic acid and phosphorous acid were replaced by the following amounts:

| | | |
|---|---|---|
| a) Talc | 80.00 g | |
| b) Litharge | 290.17 g | |
| c) 10% Acetic Acid | 2.9 ml | |
| d) Phosphorous Acid (100%) | 35.33 g | |

The final pH of the product was 7.78 and the yield was 398.1 g.

EXAMPLE 9

This example illustrates the preparation of a stabilizer comprising talc complexed with dibasic lead stearate wherein the weight ratio of the dibasic lead stearate to talc is 1:1.

Exactly 100.0 g of the talc of example 1 were dusted into 700 ml of water contained in a 7 × 6 inches stainless steel beaker equipped with a 2 blade 5 inches diameter stirrer, hot plate, lead covers and thermometer. Then 56.38 g of litharge were wet-bolted (—100 mesh) with 205 ml of water into a 6 inches evaporating dish and added to the stirred talc slurry. Then 3.6 ml of 10 percent monoethanolamine was added to the talcli-tharge slurry. A stearic acid emulsion, consisting of 46.40 g stearic acid (acid value 203.6), 26.09 ml of 1.84 percent ammonium hydroxide and 330 ml of hot water was added in 40 minutes to the stirred litharge-talc slurry at a reaction temperature of 21°–30°C. The stearic acid emulsion was kept at 65°C in a 1 liter Pyrex beaker with spout equipped with an electric hot plate with stirrer, Teflon spin bar, thermometer and watch glass. The temperature of the resultant off-white slurry was raised at 55°C and stirred for 1 hour. The final pH was 10.0. The product was recoverd by filtration, dried at 115°C for 17 hours and hammer-milled through an 0.030 inch screen.

The yield of the product was 197.2 g.

EXAMPLE 10

This example illustrates the preparation of a stabilizer comprising talc complexed with dibasic lead phthalate wherein the weight ratio of dibasic lead phthalate to talc is 1:1.

Exactly 100 g of the talc of Example 1 were stirred into 700 ml of water. Then 82.12 g of litharge were slurried in 200 ml of water. The litharge slurry was added to the stirred talc slurry followed by 2.4 ml of 10 percent acetic acid and the mixture was heated to 90°C. Then 18.86 g of 100 percent phthalic anhydride was dissolved in 325 ml of 90°–93°C water. The 90°C phthalic acid solution was added in 15 minutes to the stirred 90°C litharge-talc slurry. The slurry was then stirred for 50 minutes at 90°C during which time 600 ml of water (for thinning purposes) and 1.50 g of 100 percent phthalic anhydride dissolved in 60 ml of boiling water were added. The white slurry (pH 9.0) was then stirred for an additional hour at 90°C. The solids were recovered by filtering, drying at 105°C and grinding.

EXAMPLE 11

This example illustrates the extent of coating of various silica based substrates compared to the hydrous magnesium silicate substrate (talc) of this invention by using a methylene iodide sink/float method. The sink/float method uses methylene iodide which has a density of 3.3 as a bath. Samples immersed in the bath will sink to the bottom if coated on the substrate due to the density of the lead compound and the talc while uncoated samples will show two layers, the less dense silica-based substrate on top with the more dense product (lead compound) on the bottom. Various silica-based substrates were used to form a composite with various basic lead compounds using the procedures outlined in Examples 1–8. The resulting products were then subjected to the sink/float method according to the following procedure:

Exactly 0.10–0.30 g sample were added to 5 ml of stirring methylene iodide contained to 30 ml Pyrex beaker equipped with stir plate and Teflon spin bar. The slurry was stirred for 3–5 minutes and transferred to a 10 ml test tube and placed in a centrifuge for 1 minute. No separation of sample with a clear layer indicated excellent coating. Results are given in Table 1. In all samples the amount of basic lead compound was 50 percent of the weight of the stabilizer.

As the table shows the talc substrate of this invention is the only silica based substrate tested which gave products that indicated tenacious coating with the basic lead compounds.

TABLE 1

| | Silica-Based Substrate | (Density g/cc) | Basic Lead Compound | (Density g/cc) | Extent of Coating |
|---|---|---|---|---|---|
| 1. | hydrous silica (no magnesium) | 2.6 | dibasic lead phosphite | 6.1 | none |
| 2. | hydrous calcium silicate | 2.1 | dibasic lead phosphite | 6.1 | none |
| 3. | crystalline calcium silicate | 2.9 | dibasic lead phosphite/ tribasic lead sulfate mixture | 6.3 | none |
| 4. | diatomaceous silica | 2.1–2.2 | dibasic lead phosphite | 6.1 | none |
| 5. | talc | 2.75 | stabilizer of Example 10 | 6.2 | good |
| 6. | talc | 2.75 | dibasic lead phosphite/ tribasic lead sulfate | 6.3 | Excellent |
| 7. | talc | 2.75 | dibasic lead phosphite | 6.1 | Excellent |

We claim:

1. A composite of from 30 to 80 percent by weight of a basic lead compound and from 20 to 70 percent by weight of a hydrous magnesium silicate; said basic lead compound represented by the formula: n PbO .Pb A; wherein n is a number from 1 to 4 and A is an anion radical selected from the group consisting of phosphite, organic carboxylate, mixtures of phosphite and sulfate, mixtures of phosphite and organic carboxylate and mixtures of sulfate and organic carboxylate.

2. The composite of claim 1 wherein said hydrous magnesium silicate is a talc having from about 59 to 64 percent combined $SiO_2$ and from about 28 to 32 percent combined MgO by weight.

3. A composite of from 30 to 80 percent by weight of a basic lead compound and from 20 to 70 percent by weight of a talc substrate, said basic lead compound represented by the formula; n PbO . Pb A; wherein n is a number from 1 to 4 and A is an anion radical selected from the group consisting of phosphite and sulfate, aliphatic carboxylate having from about 8 to 20 carbon atoms, aromatic carboxylate and, B- unsaturated discarboxylate; said talc containing 62 percent combined $SiO_2$ by weight and 31 percent combined MgO by weight.

4. The basic lead compound of claim 3 which comprises dibasic lead phosphite.

5. The basic lead compound of claim 3 which comprises a mixture of tribasic lead sulfate and dibasic lead phosphite wherein the weight ratio of tribasic lead sulfate to dibasic lead phosphite is from 1:1 to 3:1.

6. The basic lead compound of claim 3 which comprises dibasic lead stearate.

7. The basic lead compound of claim 3 which comprises dibasic lead phthalate.

8. A method for producing a composite of a heat sensitive basic lead compound and a hydrous magnesium silicate comprising;
   a. forming a uniform aqueous slurry of a hydrous magnesium silicate, litharge and a catalyst, the weight of said litharge being from ⅓ to 3 times the weight of said hydrous magnesium silicate;
   b. adding to said slurry from ½ to 1/5 equivalents based on the amount of litharge in said slurry of a reactive acid to form said composite; and
   c. recovering said composite from said slurry.

9. A method for producing a composite of a basic lead compound and talc; said basic lead compound represented by the formula: n PbO . Pb A wherein n is a number form 1 to 4 and A is an anion radical mixture selected from the group consisting of phosphite and sulfate, phosphite and organic carboxylate, and sulfate and organic carboxylate comprising;
   a. forming a uniform aqueous slurry of talc, said talc having from about 59 to 64 percent combined $SiO_2$ and from about 28 to 32 percent combined MgO by weight, and Litharge, the weight of said litharge being from ⅓ to 3 times the weight of said talc;
   b. adding a catalyst to said slurry;
   c. adding to said slurry from ½ to 1/5 equivalents based on the amount of litharge in said slurry of a reactive acid mixture to form said composite; said reactive acid mixture being the source of said anion radical mixture in said basic lead compounds; and
   d. recovering a composite from said slurry.

10. The process of claim 8 wherein said reactive acid mixture comprises sulfuric and phosphorous acids.

* * * * *